United States Patent [19]

Pál

[11] Patent Number: 4,689,465

[45] Date of Patent: Aug. 25, 1987

[54] PROCESS FOR PRODUCING A COHERENT BOND BETWEEN THIN METAL SURFACES

[76] Inventor: Gál Pál, Fadrusz u. 12., Budapest 1114, Hungary

[21] Appl. No.: 733,229

[22] Filed: May 10, 1985

[30] Foreign Application Priority Data

May 13, 1984 [HU] Hungary .............................. 1855/84

[51] Int. Cl.[4] ........................ B23K 11/00; B23K 13/00
[52] U.S. Cl. .................................. 219/117.1; 219/9.5; 219/78.02
[58] Field of Search .................. 219/117.1, 118, 78.02, 219/9.5, 10.41, 10.53

[56] References Cited

U.S. PATENT DOCUMENTS

| 3,121,785 | 2/1964 | Terrill et al. ......................... 219/118 |
| 3,214,564 | 10/1965 | Katzer et al. ................ 219/117.1 X |
| 3,592,993 | 7/1971 | Bennett ........................... 219/118 X |
| 3,758,741 | 9/1973 | Holko et al. ................. 219/117.1 X |

FOREIGN PATENT DOCUMENTS

| 154673 | 11/1968 | Hungary . |
| 157652 | 3/1971 | Hungary . |
| 175919 | 3/1981 | Hungary . |
| 1245580 | 9/1971 | United Kingdom . |
| 1273141 | 5/1972 | United Kingdom . |

OTHER PUBLICATIONS

"High–Frequency Induction Heat Speeds Production Joining of Metal Parts", *The Eutectic Welder*, Mar. 1946, pp. 1-2.

*Primary Examiner*—E. A. Goldberg
*Assistant Examiner*—C. M. Sigda
*Attorney, Agent, or Firm*—Schweitzer & Cornman

[57] ABSTRACT

A coherent bond is formed for thin metallic sheets by hot press welding an auxiliary deformable material to the sheets to be bonded together. During application of a force to the deformable material, the oxide layer on the metallic structural elements is physically moved by the deformation of the auxiliary deformable material. In this manner, the auxiliary deformable material is directly bonded to clean metal and is built into the crystalline lattice structure of the thin metallic elements to thereby produce a coherent bond.

6 Claims, 12 Drawing Figures

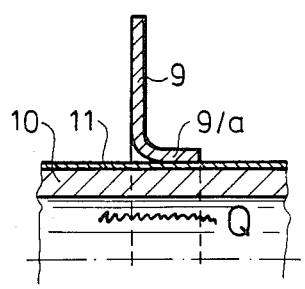
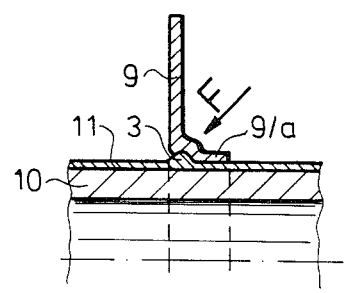
Fig.9　　　　Fig.10
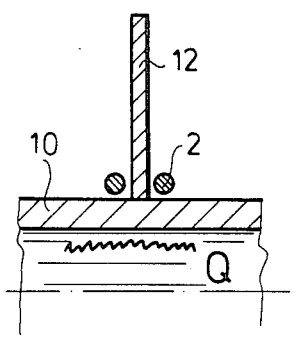
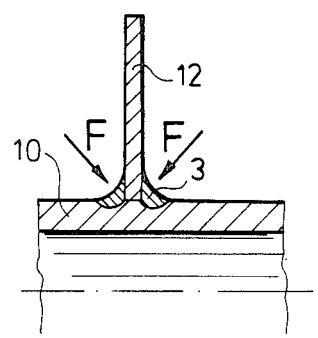
Fig.11　　　　Fig.12

PROCESS FOR PRODUCING A COHERENT BOND BETWEEN THIN METAL SURFACES

BACKGROUND OF THE INVENTION AND DESCRIPTION OF THE PRIOR ART

The invention relates to the performance of hot-press welding of components in particular made of thin material, individually or uniformly on a plurality of surfaces, in course of which coherent bond between the components is achieved by means of a deformable auxiliary material causing mechanical material forming on the surfaces to be connected of two or more components, as well as by the aid of the deforming effect affecting said structural parts.

The process can be expediently used for producing a metallic bond between the components of heat-exchangers of different destination, geometry and material, while the bond is formed from the own material of the components.

Processes are known in course of which the assembled parts—after having performed preparatory works on the surface—dipped into a molten metal bath in order to achieve a metallic bond and a uniform metal coat on the surface, while the coating metal provides a metallic bond between the structural parts. These metal baths consist of heavy metals of low melting point and of their alloys. These are expensive and application is energy-consumptive (e.g. Sn, Sn+Pb, Zn baths).

With other solutions the components to be assembled are coated in advance—partly or entirely—with said heavy metals or their alloys; thereafter the assembled jointless components are covered with a fluxing agent and by heating in a furnace or with a gas-flame they are heated to the melting temperature of the coating metal, as a consequence the metal coating on the surface is melted. Due to inaccuracies of assembly this solution is not at all reliable, in addition, requirement of heavy metals is too high. Such solutions are specified in the Hungarian Patents HU-PS No. 154 673, HU-PS No. 157 652 and HU-PS No. 157 652 (FIGS. 11, 12 and 15.)

Processes are also known in course of which the parts are bound by electric arc welding, shielded arc welding, electric spot welding, ultrasonic welding, i.e. flame-or plasma welding. These processes require a lot of appliances, the productivity is low and due to known difficulties of welding and soldering they are unsuitable for the use with light metals. Such a solutions is to be found in the patent GB-PS No. 1 245 580.

With other processes said diffuculties are eleminated so, that the components are glued with different synthetic materials. However, these are not sufficiently stable and surface preparation is most complicated. Structure of gluing material is different from that of the metal, accordingly it cannot be used for conducting either heat or electricity. They are suitable for processes with a long holding time, as under the heat effect the adhesive becomes decomposed, the stress resulting from different dilatations fatigues the adhesive etc. This solution is partly described in the Hungarian Patent Application No. 2415/80.

Processes are also known in course of which the structural parts are fixed to the connected components by using electric spot welding or ultrasonic welding simultaneously with production. Although—compared to the previously described similar solutions—these represent a progress in respect to productivity, the technological disadvantage cannot be eliminated. Such a solution is specified in the Hungarian Patent HU-PS No. 175 919.

Solutions are known, with which at the heat-exchangers there is only a metallic mechanic connection between the structural element carrying the cooling medium and the heat radiating ribs. As there is no coherent contact, a heat-bridge is formed between the contacting surfaces, accordingly, their heat transmission does not comply with requirements. As a consequence of the different dilatation of the structural elements and shocks arising during operation the contacts may be drifted apart and their thermal output deteriorates. Such a solution is described in the Patent Application No. AO-308.

It has been also proposed that structural parts should be bound by hot-press welding from own material, simultaneously with the production of the components, however, application of said solutions are restricted by successfully with structures made of thin materials, as percentage of material formation needed for hot-press welding (30%) requires an utmost high pressure force or a very high operational temperature in case of thin materials. These two technological conditions are disadvantageously influencing material structure, strength and density of teh unit to be produced.

All the processes proposed mean considerable loading of the producing means in respect to strength and heat, as a consequence, the dimensions of said components do not enable to form dense and high ribs for heat—exchangers, although both geometric requirements form the basis of modern construction and production of heat—and air technical equipments.

In general it can be stated that known solutions have always required thicker materials for material formation, as it had been motivated by the physical properties of the structural material. As a consequence, equipments have been produced with far more material, at higher costs and with an excess-weight, than required by the material characteristics, as if a suitable production technology had been applied.

High loads in respect to strength and thermal load involved with known processes did not enable production of compact heat-exchangers so, that bonds could be formed of the own material of the components, only heat-exchangers with symetrically arranged elements with equal countersupport could be produced.

Such solutions are proposed e.g. in the British Patent GB-PS No. 1 273 141 and in the Hungarian Patent HU-PS No. 175 919.

Compared to prior arts, the present invention represents a progressive process based on new recognitions, eliminating deficiencies of known solutions and yielding increased reliability, as

- it guarantees higher productivity,
- the bound formed by the process according to the invention is more stable (higher strength can be achieved) and useful life is also longer,
- from the point of view of heat flux a more advantageous coherent bound can be obtained,
- the bound thus formed resists well to extreme loads, heat and vibration.

The invention is based on the following recognitions: Two thin sheets (0,1 to 0,3 mm) can be welded by hot-pressing welding in such a manner that onto the defined place of connection an auxiliary material is placed, the thickness of which surpasses by an order of magnitude the thickness of the sheet—e.g. $\phi$—and after having heated the components to the temperature of hot-press welding, the two sheets facing each other are pressed with the force F, as a consequence, the auxiliary material will be deformed perpendicularly to the influence line of the force F, while the two sheets are welded on the deformed surface.

With light metals performance of hot-press welding is prevented by the elastic oxyde layer continuously and repeatedly formed on the surface. In a material with a thin cross-section it is most difficult to produce such a deformation which could tear apart the oxyde layer. The novelty of our invention lies in that the deformable auxiliary material adheres to the surfacial part to be welded and due to its advanced deformation it carries the surfacial oxyde layer with itself, as a consequence contact on a surface clean to metal and thus a metallurgic bound can be obtained.

One of the benefits of performing hot-press welding lies in the high-grade material formation, the magnitude of which amounts to about 30 to 50% of the cross-section. The invention is based on the recognition, in so far as, the deformable auxiliary material having been inserted between the surfaces to be welded is pressed into the surface of the materials to be welded under the influence of the force F, auxiliary material is further deformed by the force F, while the auxiliary material is flattened and the sliding material particles carry the crystallites of the surfaces to be welded with themselves, the particles of the deformed material are built-in into the micro-parts having been formed in the crystal lattice of the displaced material, as a consequence, coherent bond is established.

Formation of heat-press weldings depends on temperature, time and compressive strength. If time and temperature are given parameters, formation of the bond will be influenced by the specific compressive force. The invention lies in that unit compressive force becomes a deforming, specifically high and active compressive force due to the fact that the effect is to be considered only in respect to the cross-section of the auxiliary material to be deformed, representing only the fracture of the force, as if the sheet-surfaces to be welded had to be pressed.

The invention is also based on the recognition, in so far as the deformable auxiliary material is formed as a heating unit with electric resistance, in addition to eigenheating radiated heat pre-heats also the surfaces to be welded lying in the environment. When performing hot-press welding, the hottest deformable auxiliary material results in a considerable deformation even, if the compressive force F is less, while the particles in the crystal lattice of the surfaces to be welded become more activated.

A further characteristic of the invention lies in that when used with light metals, electric resistance of the light metal increases with rising temperature, as a consequence, at a given electric output deformable auxiliary material is heating itself.

We have also recognized that in course of prefabrication, at least on one of the surfacial parts to be welded a deforming auxiliary cross-section can be formed. This auxiliary cross-section becomes deformed in course of hot-press welding and a coherent connection is established with the counter-part component.

With pressure-proof vessels stable solid and homogeneous bonds can be formed by using the process according to the invention, resulting in a considerable technological plus-effect in case of light metals.

It is characteristic for the invention that by using the process proposed components with different material thicknesses can be interconnected, so e.g. in course of the production of heat-exchangers ribs or lamellae made of thin sheet material can be welded to media conducting pipes with thicker walls, well tolerating pressure and corrosion.

A further advantageous characteristic of the invention lies in that profiles having a thinner wall can be also used for forwarding the media, as by using the process according to the invention, in course of hot-press welding, the deformed auxiliary material is welded into the thin wall of the profile, thus reinforcing and not weakening it.

According to measurings heat resistances are, as follows:
- with mechanical bonds, with Al/Al structural materials heat resistance amounts to 0,05 kW/m$^2$C°;
- with soldered Cu/Cu structural material heat resistance amounts to 0,025 KW/m$^2$C°;
- using aluminium deformable auxiliary material heat resistance of the coherent bound amounts to 0,01 KW/m$^2$C°.

Furtheron we recognized that heat transfer ability of bounds having been formed by hot-press welding and using deformable auxiliary materials arranged in predetermined distances surpasses heat transfer capacity of known binding methods. In such a manner heat exchangers with a high efficiency can be produced.

A further recognition lies in that when using the hot-press welding process and the deformable auxiliary material neither fluxing agent nor covering material is needed. The bounds formed of eigenmaterial by hot-press welding yield equipments with a long useful life, well resisting to corrosion without any aftertreatment.

We found that bonds having been formed of the same material by using deformable auxiliary material have the same strength, as the basic material, they are well resistant to vibration, repeated thermal loads and they are insensitive to fatigue.

The invention will be described in detail by means of the drawings enclosed. Taking into consideration that the process according to the invention is mainly applicable in heat-exchanger production, the examples are taken from this field of application.

BRIEF DESCRIPTION OF THE DRAWINGS

FIG. 9 is a part of the heat-exchanger with an oval or cylindric pipe, as well as with the lamellaskirt, prepared for hot-press welding using the deformable auxiliary material, FIG. 10 shows the sectional view of the parts in a welded state, FIG. 11 illustrates the cylindrical or oval pipe with ribs formed helically or as arbours, with the deformable auxiliary material, prepared for hotpress welding, FIG. 12 shows the sectional view of the parts according to figur 11 in a bound state.

DETAILED DESCRIPTION OF THE INVENTION

Figure 1:
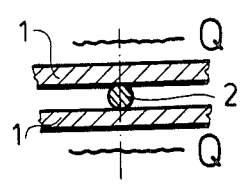
FIG. 1 is a sectional view of a pair of sheets prepared for hot-press welding.

The surface of the sheets to be seen in FIG. 1 is shown cleaned down to the surface of the metal, between them the auxiliary material 2 is arranged, the diameter of which is larger, than thickness of the sheets and material quality is the same, as that of the sheets to be welded. The radiator for preheating for the hot-press welding process is indicated with Q.

The force applied to the auxiliary deformable material is such that not less than 30% plastic material deformation is accomplished. Plastic material deformation is accomplished by applying mechanical forces to the metal surface. In this connection, the term "plastic material deformation" is a well-known term of art and to that extent the reader hereof is referred to *The Making, Shaping and Treating of Steel,* United States Steel, 1964, Chapter 19 entitled "Plastic Working of Steel" for a full understanding of the term.

Figure 2:
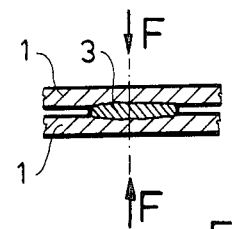
FIG. 2 is showing the pair of sheets according to FIG. 1 having been already welded, in a sectional view.

FIG. 2 shows the pre-heated sheet 1 with the hot-press welding formed under the influence of the force F. Coherent bound 3 was formed from the deformable auxiliary material according to FIG. 2 in such a manner that while flattened it was built-in metallurgically into the material surface lying next to the surfaces of the sheets 1.

Embodiments shown in FIGS. 1 and 2, respectively, can be advantageously used for binding sheets, interconnecting pipewall and water-chambers of water- and oil coolers in cars, for connecting electric busses, as intermediate welding with difficulty weldable light metals.

Figure 3:
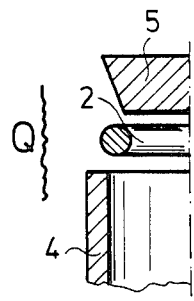
FIG. 3 is a part of the pipe end with the plug prepared for hot-press welding, in a sectional view.

FIG. 3 illustrates the deformable auxiliary material 2 matching to the opening of the pipe 4 or profile, the conical plug 5 fitting to the shape of the opening to be closed, as well as the radiator Q for pre-heating the parts to be welded.

The lower part of the closing plug 5 is smaller, the upper part larger, than the cross-section of the opening to be closed.

Figure 4:
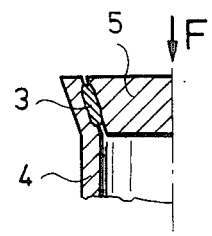
FIG. 4 is the sectional view of the pipe end and plug according to FIG. 3 bound by welding.

FIG. 4 shows the hot-press welding having been formed under the influence of the force F; as it becomes obvious from the figure, the conical closing plug bevelled the end of the pipe 4 or profile. Between the two conical surfaces the coherent bond was established from the deformed auxiliary material 2, shich is built-in into the structure of the surfaces to be welded.

Embodiments according to FIGS. 3 and 4 can be applied for closing the end of pipes and profiles, interconnecting pipes, formation of pipe-reductions, in particular for elements made of aluminium or the alloys thereof.

Figure 5:
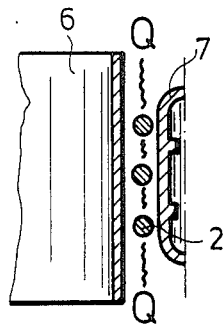
FIG. 5 is showing a part of the heat-exchanger with the flat profile with the inner rib for delivering the medium, as well as the selfheating deformable auxiliary material having been prepared for hot-press welding, in a sectional view.

FIG. 5 is showing a flat-sided profile 7 for delivering the medium, with a folded or socketed rib 6, which can be provided with an inner rib too, the deformable auxiliary material 2, as well as the radiator Q. If the wire of the deformable auxiliary material is connected to an electric supply source, it can be used as an electric resistance heater which can be heated to the temperature of hot-forming. As soon as the heat radiated by the deformable auxiliary material 2 is heating up the surfaces of the profile 7 and rib 6 lying in its environment to the temperature of the hot-press welding process, the electric supply source is disconnected and the process of welding can be performed.

It seems to be expedient if the structural unit to be welded is placed into an insulated recipient for the time of heating to obtain a higher efficiency. The assembled unit can be heated in a heat transferring furnace too, thus reaching the temperature needed for welding.

Figure 6:
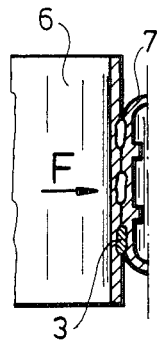
FIG. 6 is the sectional view of the welded parts according to FIG. 5.

FIG. 6 illustrates the hot-press welding having been formed under the influence of the force F, the coherent bound 3, which is built-in into the contacting surface of the rib and the profile 7.

Figure 7:
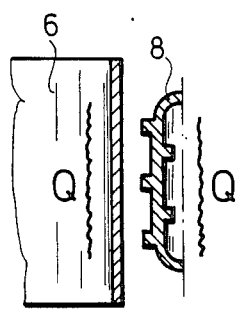
FIG. 7 is showing the sectional view of a part of the heat-exchanger having been provided with the deforming ribs on the flat surface of the profile delivering the medium.

FIG. 7 shows the profile 8 with the deformable folded or socketed rib on the flat side, with an inner rib for improving heat transfer and simultaneously serving as a distance piece, Q indicates the heater for pre-heating to the welding temperature.

According to the proposed process a heating cartridge—serving also as a holder—can be arranged in the inside of the medium delivering profile 8, while the folding blade may transfer heat to the socket of the rib. Hotpress welding can be performed in such a manner that the blade pressing the socket of the rib to the proper place is pressing it with such a force to the outer ribs of the profile 8, that they should be deformed up to the formation of hot-press welding.

Figure 8:
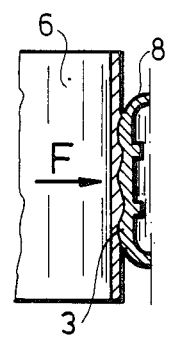
FIG. 8 is the sectional view of the parts 7 having been bound by hot-press welding.

In FIG. 8 the hotpress welding having been formed under the influence of the force F is to be seen, where the coherent bound 3 formed from the deformable auxiliary material 2 is built-in into the material structure of the socket of the rib 6 contacting the the profile 8. The embodiment shown in FIGS. 5 to 8 can be arranged next to or behind each other, in several rows, as usuable in technical practice, profiles 7 and 8 can be formed with uniform or divided ducts, in the width of the ribs 6 divided or as an entirity.

Supposed that the inner ribs are formed as cross connections between the parallel sides of the profiles 7 and 8, so these can be well used—even if they have thin walls—for the delivery of media with a higher inner pressure. The embodiments can be used for heat exchangers liquid/air or gas/air, e.g. in coolers of cars, air-conditioners, re-coolers, condensers etc.

FIG. 9 illustrates the cylindrical or oval pipe 10 with the deformable auxiliary material layer 11 formed thereon by fire-dipping process or pulled onto it in a cold forming process, the lamella 9, the part of the lamella skirt 9a and the pre-heating radiator Q.

The hot-press welded bound is formed so, that after having heated the auxiliary material layer 11 on the pipe by the heater Q to the temperature of hot-press welding process, the lamellae 9 with the loose lamella skirts 9a are to be pushed onto the auxiliary material layer 11, meanwhile the lamella skirt 9a is also heated from the radiated heat; in the last short phase of the pushing operation the skirt 9a is to be pressed onto the deformable auxiliary material layer 11 with a force releasing deformation; in course of deformation from the inner surface of the skirt 9a the oxyde layer will be removed and the deformed auxiliary material is built-in coherently into the material thereof.

FIG. 10 is also showing the hot-press welding having been formed under the influence of the force F; coherent bound 3 was formed from the deforming auxiliary material layer 11; cylindrical or oval pipe 10, lamellae 9 and lamella skirt 9a are also illustrated.

The embodiment to be seen in FIGS. 9 and 10 can be preferably used as multi-pipe constructions in dimensions being applicable in technical practice. Field of application: industrial and other air-conditioning equipments as aircoolers, air-heaters, condensers etc.

FIG. 11 is showing the cylindrical or oval pipe 10, the helically formed rib 12, the deformable auxiliary material 2, as well as the pre-heating radiator Q.

Pipe is heated to the temperature of hot-press welding by the radiator Q. Expediently the deformable auxiliary material 2 is heated as electric resistor from an electric source, as detailed in connection with FIG. 5. While winding the helical rib 12 or while placing the rib with the arbours the pipe 10 is performing a rotary motion and together with the ribs 12 it carries the deformable auxiliary material, the wires with itself; simultaneously with the operation, the auxiliary material 2 is deformed continuously to the foot of the rib 12.

FIG. 12 illustrates the hot-press welding having been formed under the influence of the force F; coherent bound 3 was formed from the deformable auxiliary material 2 and it is built in coherently into the structure of the contacting surfaces of the pipe 10 and the rib 12.

The coherently bound and ribbed pipes according to FIGS. 11 and 12 can be produced in a length and dimensional range accepted in technical practice. They can be applied as convective heat-exchangers in equipments subjected to considerable temperature fluctuations made mainly of steel, at fluepipes of boilers, for regenerating the heat contained in gas at gas-turbines etc.

As it becomes obvious from FIGS. 1 to 12, the proposed process can be used within a wide scale of application, in a wide dimensional range; compared to known solutions the process according to the invention enables up-to-date application of aluminium and the alloys thereof, steel and steel alloys with a progressive character.

The process can be matched to other geometries and to different fields of application.

What we claim:

1. A process for producing a coherent hot press welded bond between thin metal sheets of like material having a predetermined specific crystal structure, comprising the steps of:
    (a) heating the contacting surfaces of said metal sheets to the temperature of hot-press welding;
    (b) inserting between said metal sheets a deformable auxiliary material;
    (c) heating said deformable auxiliary material to said temperature; and
    (d) applying a force to said deformable auxiliary material such that at least 30% plastic material deformation is accomplished thereto, said plastic material deformation causing the particles of said deformable auxiliary material to decompose a surface portion of said predetermined specific crystal structure of said thin metal sheets and to replace said surface portion of said predetermined specific crystal structure with a portion of said auxiliary deformable material thereby preserving said predetermined specific crystal structure.

2. A process as claimed in claim 1 wherein said deformable auxiliary material is heated by an electrical resistance, using said deformable auxiliary material as the resistor, itself.

3. A process as claimed in claim 1, wherein said deformable auxiliary material is the same material as said thin metal sheets.

4. A process as claimed in claim 1, wherein aluminum and its alloys comprise said thin metal sheets.

5. A process as claimed in claim 1, wherein steel and its alloys comprise said thin metal sheets.

6. A process as claimed in claim 1, wherein said coherent bond is formed between thin metal sheets which are the structural elements of heat-exchangers.

* * * * *